Oct. 10, 1967     C. S. ROBINSON ETAL     3,346,302
LUBRICATING AND LOAD-CARRYING PAD FOR RAILWAY
CAR CENTER BEARINGS AND THE LIKE
Filed Nov. 13, 1964

United States Patent Office 3,346,302
Patented Oct. 10, 1967

3,346,302
LUBRICATING AND LOAD-CARRYING PAD FOR RAILWAY CAR CENTER BEARINGS AND THE LIKE
Cecil S. Robinson, Englewood, N.J., and Wesley J. Crake, Granada Hills, Calif., assignors to Robintech Incorporated, a corporation of New York
Filed Nov. 13, 1964, Ser. No. 411,013
2 Claims. (Cl. 308—137)

The present invention relates to an improvement in bearings comprising a lubricant retaining and load carrying element useful in bearings of many types but especially useful in a center bearing for railway cars or for similar use where bearings must operate under severe loading and environmental conditions. The center bearings on railway cars support the weight of the cars and provide limited oscillation about a vertical axis to permit the car trucks to follow the tracks. Such bearings normally comprise a bolster central bearing cavity, circular in shape and formed in the bolster of the car truck and a body central bearing plate secured to the car body, the latter plate being circular in shape adapted to enter the bearing cavity when the car body is lowered upon the truck. The relative diameters of the cavity and plate are such as to provide a relatively loose radial fit. The car bodies usually rest upon the trucks solely by gravity and for greater lateral stability the body central bearing plate also includes a centrally disposed pin which extends downwardly from the bearing plate into an opening formed centrally of the cavity in the bolster. The fit between the pin and the opening which it enters is also relatively loose in radial directions.

The vertical-load carrying surfaces of such railway car bearings are the rigid ring shaped flat surfaces of the bearing plate and the bottom wall of the cavity respectively. Lubrication of these surfaces has long constituted a severe problem partly because of the exposure of the bearing elements to contaminants such as dirt, water and particles abraded from the wheels and brakeshoes of the cars and partly because of the relatively great vertical loading under static as well as shock conditions. The relatively loose fit in radial directions and tilting between these rigid bearing surfaces in operation afford ready access of contaminants to the bearing surfaces. Tilting also results in random concentrated loading on very small portions of the total area of the bearing surfaces. Lubricants placed upon the bearing surfaces are rapidly squeezed out in radial directions and become ineffective. In view of the difficulty in maintaining such bearings in adequately lubricated condition the great majority of them wear unevenly and offer widely variable resistance to pivoting of the trucks relative to the car body. Excessive resistance to pivoting subjects the wheel flanges to rapid wear against the inside surfaces of the tracks.

The present invention provides a flexible and resilient lubricant retaining and load carrying pad interposed between the rigid bearing surfaces of bearings of this type. The pads of the present invention are made of a highly compressed mass of metal wire. The degree of compression of the wire mass before it is put into use is sufficient to form it into a porous coherent body which is resiliently compressible to yield slightly and recover under varying load conditions and yet is so firm as to maintain a very high percentage of its lubricant retaining and load-distributing capacity under severe load variations. For use in railway car center bearings the pad may be made in the shape of a ring which is comparable in area with the areas of the rigid bearing surfaces in the bearing assembly. The ring may be made of such external diameter as to lie in the bolster central bearing cavity and it may be provided with a central opening of appropriate diameter to permit insertion of the pin which extends downwardly from the body central bearing plate. When the bearing is assembled the pad may be charged with a suitable lubricant such as oil or grease which will be retained in the small openings and passageways of the pad and gradually distributed where it is needed rather than being squeezed out. Instead of the ring shape just described the metal wire masses may be given other shapes, for example a plurality of relatively small discs may be arranged in peripheral contact with one another so as to substantially cover the bearing surface areas.

In the drawings accompanying and forming a part of this specification there is illustrated an illustrative form of bearing pad embodying the present invention. It is shown in use in a typical center bearing for railway cars although it will be appreciated that the pad is capable of other uses in difficult locations such, for example, as rudder posts in ships or trailer hitches and the like.

Figure 1:
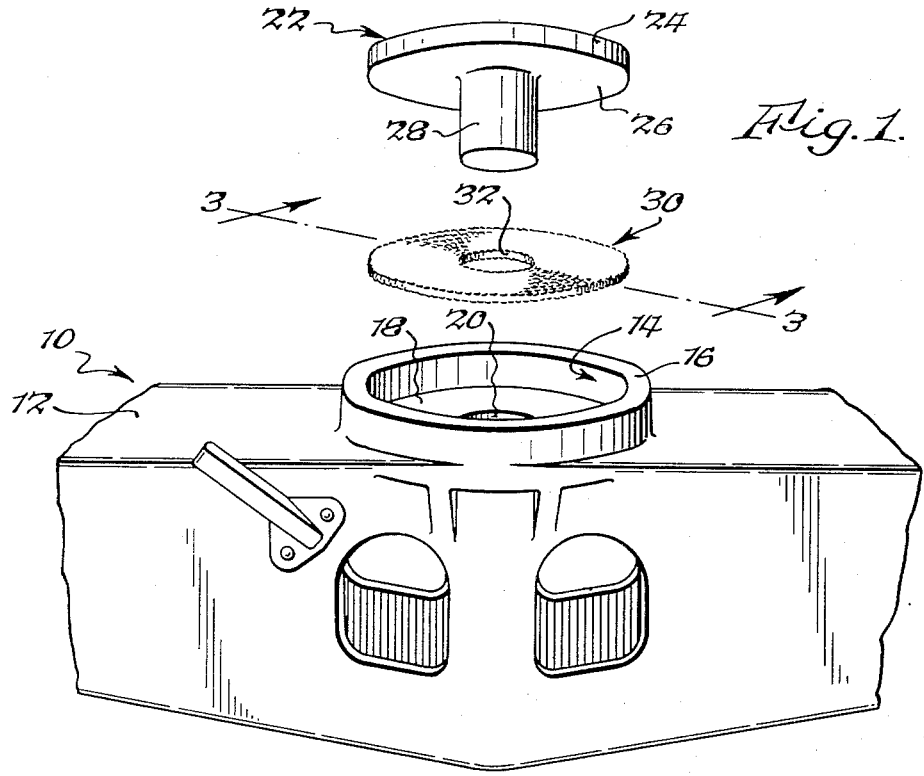
FIG. 1 is a fragmentary exploded view of a typical railway car truck bolster and center bearing assembly in which there is included one form of bearing pad embodying the present invention.

Referring now to the drawings, in FIG. 1 there is shown a central portion only of a typical railway car bolster 10. It will be understood that the bolster of a railway car truck extends laterally of the path of travel of the truck along a track. The ends (not shown) of the bolster 10 are received in parallel side frames (not shown) which in turn carry supporting springs and journal bearings for the axles of the wheel assemblies. None of the latter parts are shown herein inasmuch as the general structure is well known and details of structure, which form no part of the present invention, vary in accordance with the specifications and standards employed by different manufacturers and applying to different uses, for example there is substantial variation between truck designs intended for freight use and for passenger use. In general however a typical bolster 10 is a hollow metal section which includes a substantially solid top wall 12 disposed in a horizontal plane.

In the center of the bolster 10 there is formed a bolster central bearing cavity indicated generally at 14 which is defined by a metal ring 16 which surrounds a horizontally disposed bearing surface 18. An opening 20 is formed in the center of the bearing surface 18 and extends through the thickness of the top wall 12 of the bolster to receive a bearing pin which will be described below.

The body central bearing plate indicated generally at 22 consists of a metal disk 24 having an outside diameter slightly less than the inside diameter of the ring 16 which defines the bolster central bearing cavity 14. The lower horizontal surface 26 of the disk 24 normally constitutes a bearing surface which is adapted to rest upon the bearing surface 18 within the bearing cavity 14. A bearing pin 28 is formed of metal, which may be integral with the disk 24 or may be separate therefrom. The pin 28 extends downwardly from the center of the disk 24 to be received in the opening 20 formed in the top wall 12 of bolster 10. The cylindrical surface of the pin 28 serves as a radial bearing in cooperation with the internal surface of the opening 20 and the diameter of the pin 28 is such as to afford a relatively loose radial fit between the bearing surfaces aforesaid. The body central bearing plate 22 is secured by suitable means (not shown) to an appropriate structural element of the body of the railway car (not shown) which is to be supported upon the bolster 10.

The present invention provides a flexible and resilient lubricant retaining and load carrying pad indicated generally at 30 interposed between the bearing surfaces 18 and 26. The pad 30 is made of a mass of metal wire firmly compressed into a coherent body illustratively having an external diameter such as to lie in the bolster central bearing cavity 14. Pad 30 is constructed in the form of a ring having a central opening 32 which is of such diameter as to receive the outer cylindrical surface of the pin 28 formed upon the body central bearing plate 22.

The lubricant retaining function of the pad 30 is achieved by fabricating the pad from metal wire in such a manner and compressing it to such an extent as to bring separate elements of the wire into intimate relationship in a substantially uniform manner throughout the volume of the pad. Preferably the wire is of circular cross section and of a diameter which is quite small when compared with the total size of the pad whereby an enormous number of interstices is afforded to receive the lubricant and an enormous total surface area is provided to which lubricating material may adhere. The interstices between the wire elements open into one another whereby the lubricant with which the pad is charged exists in substantially continuous phase throughout the volume of the pad and is confined in multitudinous small pockets and passageways through which it may flow. This, coupled with the limited flexing of the pad which occurs in use, will assure that an adequate supply of lubricant will be continuously supplied to the surface areas of the pad 30 throughout a long service life.

Figure 4:
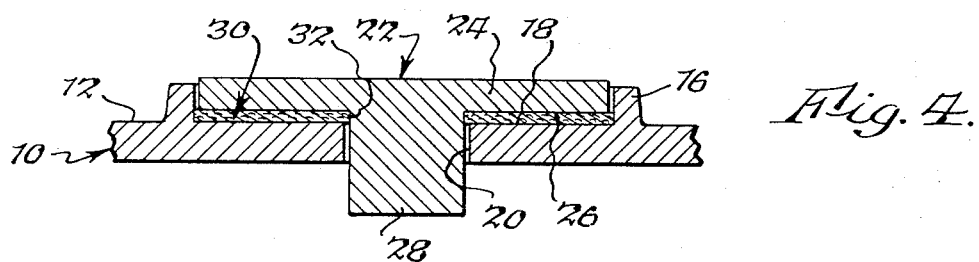
FIG. 4 is a vertical section taken through the axis of oscillation of the bearing in assembled form.

As shown in FIG. 4 the upper and lower ring-shaped surfaces of the pad 30 are in contact respectively with the bearing surfaces 26 and 18 whereby said surfaces of the pad 30 serve as major bearing surfaces for pivotal movements under the vertical load of the car body upon the bolster 10. Since the latter surfaces are made up of a large number of convolutions of wire separated by openings filled with lubricant it will be apparent that the lubricant in the pad 30 will have ready access to the surfaces 26 and 18.

The degree of compression to which the pad 30 is subjected in the course of fabrication thereof is such that under design service loading the pad may deflect or become distorted and recover locally and may compress and expand as a unit within predetermined limits of amplitude. Thus the pad may yield in response to local concentrations of load due to tilting of the bearing surfaces incident to rocking and twisting of the railway car truck relative to the car body. This action equilizes the unit loading on the bearing surfaces by keeping the working areas thereof substantially unchanged whereby the frictional resistance of the bearing remains substantially uniform. At the same time a sort of pumping action occurs which is effective to put the lubricant in motion minimizing any tendency toward hardening of exposed lubricant or isolation of lubricant in interior zones of the pad.

Figure 2:
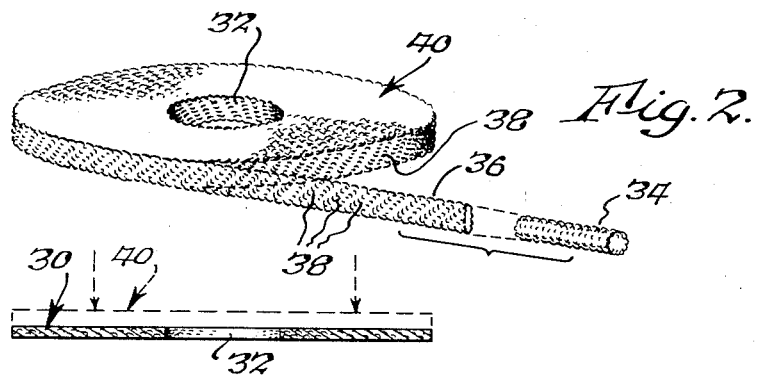
FIG. 2 is a somewhat diagrammatic view illustrating one manner in which the bearing pad of the present invention may be fabricated.

While the wire from which the pad 30 is fabricated may be assembled and compressed in various manners a preferred procedure leading to great stability and uniformity in texture throughout the volume of the pad is illustrated in FIG. 2. The pad shown in FIG. 2 is fabricated from knitted metal wire which initially is formed as a knitted tube 34 on a circular knitting machine. In its simplest form tube 34 may be knitted from a single continuous length of metal wire which is so manipulated as to form a continuous tube in which successive turns of the wire form lengths which extend circumferentially of the tube. Each length is bent locally beyond its elastic limit as a result of interlocking of stitches as the tube is formed. Thus each length forms, in effect, a flattened spring which may be readily stretched or compressed. The tube 34 is knitted with a diameter such that when the tube is flattened longitudinally it will form a two ply ribbon having a width appropriately chosen for the formation of a pad of desired thickness. Thus in FIG. 2 the tube 34 is flattened to form a ribbon 36 which is wound convolutely upon an mandrel (not shown) having an outside diameter appropriate for the formation of the central opening 32 in the finished cushion 30. Preferably the flattened tube 36 is corrugated transversely to provide further interlocking between the lengths of wire in the plies thereof. It has been found particularly desirable to form such corrugations angularly with respect to the axial length of the ribbon 36 as illustrated at 38.

Figure 3:
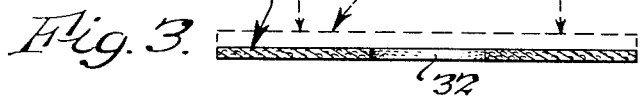
FIG. 3 is a vertical sectional view taken along the line 3—3 in FIG. 1.

The flattened corrugated ribbon 36 is wound as shown in FIG. 2 until a sufficient number of turns is laid up convolutely so as to provide a flat ring-shaped body 40 having an external diameter which is approximately the external diameter desired for the finished pad. By this operation the body 40 is formed with a thickness, in the direction of the axis of the opening 32, which is greater by a predetermined amount than the thickness desired for the finished pad 30. The thickness of the body 40, as will be apparent, is equal to the transverse width of the flattened tubular ribbon 36 and the flattened spring-like lengths of wire are now largely so oriented as to extend continuously from one surface of the pad to the other in directions generally parallel with the cylindrical axis of the pad. The density of the body 40, in terms of the relative volume thereof which is made up of metal wire, is dependent upon the gauge of the wire, the number and fineness of the stitches formed in the knitting machine and the relative tightness with which the flattened tube 36 has been wound upon the mandrel. The final density and deflection characteristics for the particular service to which the pad is to be subjected is established by compressing the body 40 under a loading which is several times as great as the design maximum service loading in a direction parallel with the cylindrical axis of the body 40 during which operation the lengths of wire will be collapsed upon themselves and into contact with adjacent lengths. A great percentage of the local distortions of the wire will involve bending of the wire beyond its elastic limit so that upon removal of the pre-compression loading the body 40 will recover only a portion of its original thickness. Thus the finally compressed pad 30 will assume a thickness which is substantially less than that of the uncompressed body 40. In FIG. 3 the pad 30 is illustrated having a predetermined final thickness and the relationship of such thickness to the original thickness of the body 40 is diagrammatically indicated by the superimposing upon FIG. 3 of a broken line illustration of the pad 40. The individual wire lengths, although now distorted, will still extend from one surface of the pad to the other in directions generally parallel with the cylindrical axis of the pad 30 and they thus will act as springs extending in the direction of service loading. Such disposition assures substantial freedom from drift or further permanent compaction under service conditions.

In the operation of winding up the body 40 as illustrated in FIG. 2 the oblique corrugations 38 in each successive turn of ribbon will fall with varying degrees of accuracy into mesh with the corrugations in the preceding turn and such meshing is sufficiently extensive as to assure that a considerable portion of the wire in each turn of ribbon will project into the adjacent turns. Therefore upon pre-compression of the body 40 to the final thickness of the pad 30 extensive interlocking of wire lengths between adjacent turns will be assured whereby the final pad structure has a very great degree of stability in the sense that any tendency toward unwinding or interlaminar movement is almost completely obliterated. The closely packed, interlocked wire structure nevertheless may be compressed and will recover by expansion under service loadings because it includes a very great number of quite uniformly distributed randomly directed spans of wire which extend between points of contact with adjacent wire portions. These spans of wire are short increments which individually act as springs which yield upon compression or distortion of the pad 30. However, as they yield under compression they are progressively brought into contact with additional adjacent spans of wire whereby the lengths of the spans are progressively reduced and resistance to further compression or distortion increases in a sharply non-linear manner. Compression and expansion under service loadings is highly damped as a result of friction between relatively moving adjacent wire portions.

A typical pad 30, thus fabricated and under no load, may have a void volume of about 63% and a metal volume of about 37%. Under its design loading such a pad will have a void volume of about 57% and a metal volume of about 43%. It will be apparent that even under loaded conditions the pad 30 provides an adequate volume of voids which may be filled with lubricant. The maximum deflection by compression under loaded conditions is only several hundredths of an inch and is well within the elastic limit of the compressed pad 30. Since, as discussed above, the volume of voids in which the lubricant is retained is subdivided into small spaces of approximately capillary size the lubricant with which the pad is loaded will be slowly and gradually dispensed to the bearing surfaces over a long service life. Because the openings within the pad 30 are so small and filled with oil or grease and because the resilient pad 30 flexes and adjusts itself to relative motion between the other bearing elements most contaminants are not afforded an opportunity to enter the body of the pad and there is seldom, if ever, any space between the surfaces of the pad and the bearing surfaces 18 and 26 into which contaminants may work their way. The long service life of a single charge of lubricant results in substantial reduction in cost of maintenance of the center bearings and the unusually effective lubrication afforded the bearing maintains uniform the desired degree of frictional resistance against pivotal motion of the truck which is calculated to produce the least wear upon wheel flanges and to minimize hunting. On relatively infrequent occasions routine servicing of the bearings may be performed by adding appropriate lubricant to the pad 30 or by disassembly of the bearing, washing the pad 30 with a solvent and recharging it with fresh lubricant.

From the foregoing description it will be apparent that the function of the pad 30 in retaining and distributing a lubricant evenly upon the bearing surfaces makes an important contribution to uniformity of bearing action. However, various proposals have been made and tried in the past for the maintaining and distributing of a lubricant supply in the center bearings for railway cars. These have included pressure lubricating systems and/or grooved or drilled bearing or wear inserts. From a practical standpoint the irregularities of the surfaces of the rigid bearing elements and the tilting, however slight, which inevitably occurs in service, result in drastic variation in the lubricant film and in the area of bearing surfaces in contact at any given moment so that unit area bearing loads as well as resistance to turning of the car truck relative to the car body vary widely and erratically. Since with too low resistance to turning the truck will hunt and with too high resistance the wheel flanges will be subjected to excessive wear and shock, it will be apparent that the mere provision of lubricant to such rigid bearing surfaces does not solve the problems of non-uniform frictional resistance or uneven or rapid wear. The limitedly yieldable lubricating and bearing pad of the present invention will continuously and repeatedly adjust itself to surface irregularities of the rigid bearing elements and will absorb the forces tending to cause tilting between the bearing surfaces over a period of time which is sufficient to permit the spring suspension of truck to react. Thus, the bearing areas between the pad 30 and the rigid surfaces 18 and 26 will remain substantially constant and resistance to turning of the truck relative to the car body will remain sufficiently constant to minimize hunting or excessive wheel flange wear.

It will be understood that the detailed description of the use of the bearing pad of the present invention in specific bearings for railway cars has been provided solely for illustrative purposes. The principles of the present invention are readily adaptable to specifically different embodiments and for the accomplishment of specifically required results. The selection of a particular type of steel or other metal for the wire from which pads 30 may be fabricated may be made on the basis of one or more factors such as initial cost, service life and the meeting of any special or unusual service conditions. For example unhardened low carbon steel wire may be used and has been found to be sufficiently durable inasmuch as in use the pad remains impregnated with a lubricating material which ordinarily will be effective to prevent corrosion or oxidation. However, high carbon or alloy steels may be used where greater resiliency is desired. Also for extremely severe exposure conditions it may be preferred to utilize stainless steel or other corrosion resistant wire or a wire which has been plated with some other metal. For example a wire plated with cadmium will be corrosion resistant and also may be desirable in some instances because of the anti-friction characteristics of cadmium. Also the particular type and gauge of wire may be so selected if so desired as to insure that the major amount of wear in service occurs upon the wire in the pad 30 rather than upon the rigid metal bearing surfaces 18 and 26.

What is claimed is:

1. In a heavy-duty, load-supporting railway car center bearing having rigid, flat normally parallel bearing surfaces disposed substantially normal to the axis of load support and providing for oscillatory movement between said surfaces about said axis as well as for limited tilting of said surfaces out of parallelism, the improvement which comprises a flexible and resilient lubricant-retaining and load-carrying pad of metal wire adapted to be interposed between said rigid flat bearing surfaces, said pad being composed of a strip of flattened tubular knitted metal wire fabric convolutely wound upon itself and said pad being highly compressed in directions transverse the width of said strip and parallel with the axis of load support, the metal wire of which said pad is composed having cross-sectional dimensions which are very small compared with the total size of said pad whereby adjacent elements of said wire in said compressed pad are in intimate interlocking relationship which is substantially uniform throughout the volume of said pad with portions of adjacent elements of said wire spaced to form small pockets and passageways of approximately capillary size, said pad being adapted to retain lubricant in a substantially evenly distributed continuous phase throughout the volume of the pad in said small pockets and passageways through which lubricant may flow into contact with said bearing surfaces, said portions of said elements of said wire being resiliently movable relative to one another and in many instances being movable into frictional engagement with one another to make said pad resiliently compressible to yield slightly and recover under varying load conditions, yet firm enough to maintain a very high percentage of the lubricant-retaining and load-distributing capacity thereof under conditions including severe load variations and tilting of said bearing surfaces out of parallelism.

2. A heavy-duty, load-supporting bearing in accordance with claim 1 wherein said strip of fabric is corrugated along lines extending from edge to edge of said fabric to enhance the extent and uniformity of interlocking of elements of said metal wire in said highly compressed pad.

(References on following page)

References Cited

UNITED STATES PATENTS

| | | | |
|---|---|---|---|
| 1,601,381 | 9/1926 | Thompson | 308—237 |
| 2,039,386 | 5/1936 | Borst | 308—238 |
| 2,100,159 | 11/1937 | Curstadt | 308—240 |
| 2,439,424 | 4/1948 | Goodloe et al. | 308—240 X |
| 2,607,982 | 8/1952 | Hack et al. | 308—237 |
| 2,667,389 | 1/1954 | Smith | 308—240 |
| 2,680,284 | 6/1954 | Markowski et al. | 29—419 |
| 2,761,203 | 9/1956 | De Witt | 29—419 |
| 2,910,329 | 10/1959 | Runton | 308—163 |

FOREIGN PATENTS

| | | |
|---|---|---|
| 156,990 | 6/1954 | Australia. |
| 379,629 | 9/1932 | Great Britain. |

MARTIN P. SCHWADRON, *Primary Examiner.*

DAVID J. WILLIAMOWSKY, *Examiner.*

N. ABRAMS, R. F. HESS, *Assistant Examiners.*